(12) United States Patent
Li et al.

(10) Patent No.: US 10,068,151 B2
(45) Date of Patent: Sep. 4, 2018

(54) METHOD, DEVICE AND COMPUTER-READABLE MEDIUM FOR ENHANCING READABILITY

(71) Applicant: Beijing Xiaomi Mobile Software Co., Ltd., Haidian District, Beijing (CN)

(72) Inventors: Guosheng Li, Beijing (CN); Zhongsheng Jiang, Beijing (CN); Xiaoxing Yang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 15/450,786

(22) Filed: Mar. 6, 2017

(65) Prior Publication Data
US 2018/0018536 A1   Jan. 18, 2018

(30) Foreign Application Priority Data

Jul. 18, 2016 (CN) .......................... 2016 1 0565685

(51) Int. Cl.
*G06K 9/46* (2006.01)
*G09G 5/00* (2006.01)
(Continued)

(52) U.S. Cl.
CPC ......... *G06K 9/4652* (2013.01); *G06K 9/4604* (2013.01); *G06T 5/40* (2013.01); *G09G 5/00* (2013.01); *H04N 1/56* (2013.01); *H04N 1/6072* (2013.01); *G06K 9/4642* (2013.01); *G09G 2320/066* (2013.01);
(Continued)

(58) Field of Classification Search
CPC ............... G06K 9/4652; G06K 9/4604; G06K 9/00288; G06K 9/00697; G06K 9/00798; H04N 1/4092; H04N 1/40068; G06T 2207/20192; G06T 5/003
See application file for complete search history.

(56) References Cited

U.S. PATENT DOCUMENTS

2002/0176638 A1* 11/2002 Stone .................. G06K 9/0063
382/294
2004/0016814 A1    1/2004 Muramatsu
(Continued)

FOREIGN PATENT DOCUMENTS

CN     101217668 A     7/2008
CN     103327322 A     9/2013
(Continued)

OTHER PUBLICATIONS

Extended European search report issued in corresponding European Application No. 17159074.8, dated Aug. 29, 2017, 8 pages.
(Continued)

*Primary Examiner* — Ali Bayat
(74) *Attorney, Agent, or Firm* — Arch & Lake LLP

(57) ABSTRACT

The present disclosure relates to a method and device for enhancing readability and a computer-readable medium and belongs to the field of display technology. The method for enhancing readability includes acquiring image feature information of an image; identifying an image type of the image based on the image feature information; selecting a readability enhancing way corresponding to the image type; and enhancing the image by the readability enhancing way.

17 Claims, 7 Drawing Sheets

(51) Int. Cl.
*G06T 5/40* (2006.01)
*H04N 1/56* (2006.01)
*H04N 1/60* (2006.01)

(52) U.S. Cl.
CPC . *G09G 2320/0613* (2013.01); *G09G 2340/14* (2013.01); *G09G 2360/144* (2013.01); *G09G 2360/16* (2013.01)

(56) References Cited

U.S. PATENT DOCUMENTS

| | | | | |
|---|---|---|---|---|
| 2006/0274949 | A1* | 12/2006 | Gallagher | G06K 9/00288 382/228 |
| 2008/0062481 | A1* | 3/2008 | Moriya | H04N 1/40068 358/518 |
| 2008/0068660 | A1* | 3/2008 | Loce | H04N 1/40075 358/3.06 |
| 2010/0060805 | A1 | 3/2010 | Takeda et al. | |
| 2013/0259373 | A1 | 10/2013 | Ozawa et al. | |
| 2015/0339808 | A1 | 11/2015 | Tsuda et al. | |

FOREIGN PATENT DOCUMENTS

| | | |
|---|---|---|
| CN | 103517049 A | 1/2014 |
| CN | 103680371 A | 3/2014 |

OTHER PUBLICATIONS

First Office Action (including partial English translation) issued in corresponding Chinese Patent Application No. 201610565685.3, dated Sep. 28, 2017, 9 pages.

Supplemental Search Report issued in corresponding Chinese Application No. 201610565685.3 dated Dec. 13, 2017, 9 pages.

* cited by examiner

METHOD, DEVICE AND COMPUTER-READABLE MEDIUM FOR ENHANCING READABILITY

CROSS REFERENCE TO RELATED APPLICATION

This application is based on and claims priority to Chinese Patent Application No. 201610565685.3, filed Jul. 18, 2016, the content of which is incorporated herein by reference in its entirety.

TECHNICAL FIELD

The present disclosure generally relates to the field of display technology, and more particularly, to a method, device and computer-readable medium for enhancing readability.

BACKGROUND

Terminals such as smart phones and tablets can be used in various application scenarios. When the terminals are under strong light irradiation, readability of words or pictures that are displayed on the terminals may be reduced. The display of the terminals can be improved by applying the readability enhancement method to image frames that are displayed on the terminals.

SUMMARY

The present disclosure provides a method, a device and a computer-readable medium for enhancing readability.

According to a first aspect in the present disclosure, a method for enhancing readability is provided. The method may include: acquiring image feature information of an image; identifying an image type of the image based on the image feature information; selecting a readability enhancing way corresponding to the image type; and enhancing the image by the readability enhancing way.

According to a second aspect in the present disclosure, a device for enhancing readability is provided. The device may include a communication component, a processor and a memory for storing executable instructions. The processor may be configured to perform the executable instructions to acquire image feature information of an image; identify an image type of the image based on the image feature information; select a readability enhancing way corresponding to the image type; and enhance the image by the readability enhancing way.

According to a third aspect in the present disclosure, a non-transitory computer-readable storage medium having stored therein instructions is provided that, when instructions are executed by a processor of a terminal, may cause the terminal to acquire image feature information of an image; identify an image type of the image based on the image feature information; select a readability enhancing way corresponding to the image type and enhance the image by the readability enhancing way.

It is to be understood that both the forgoing general descriptions and the following detailed descriptions are exemplary and explanatory only, and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Figure 1:
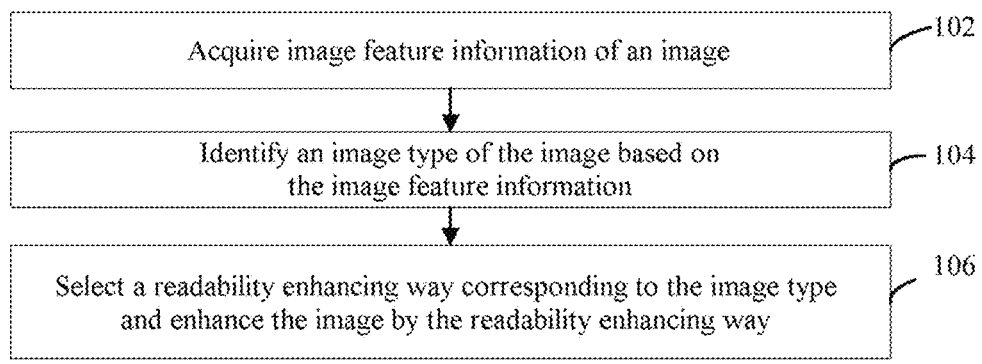
FIG. 1 is a flow chart illustrating a method for enhancing readability according to an exemplary embodiment.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the disclosure. Instead, they are merely examples of devices and methods consistent with aspects related to the disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or"

used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

When enhancing multiple images, the same readability enhancing way may be used to enhance every image frame displayed on a terminal. However, the same readability enhancing way may not be suitable for some images such as user interface (UI) images. The UI images may be artificially designed and may already have good original readability. A strong readability enhancement to the UI images may instead damage the beauty of the UI images. Therefore, the present disclosure provides the following exemplary embodiments.

FIG. 1 is a flow chart illustrating a method for enhancing readability according to an exemplary embodiment. As shown in FIG. 1, the method for enhancing readability includes the following steps.

In step 102, image feature information of an image can be acquired.

In step 104, an image type of the image can be identified based on the image feature information.

In step 106, a readability enhancing way corresponding to the image type can be selected and applied to enhance the image.

As above described, with the method for enhancing readability in the exemplary embodiment, the image type of the image can be identified based on the image feature information, and thus an appropriate readability enhancing way corresponding to the identified image type can be selected and applied to enhance the image. Different from enhancing every image frame with the same readability enhancing way that may damage the beauty of a UI image, the exemplary embodiment can apply different readability enhancing ways to enhance different types of image frames. Therefore, the readability of each type of images can be enhanced and then the display effect of the terminal can be entirely improved.

Optionally or alternatively, the image type may include: nature image and UI image. A nature image may be an image that is generated based on a natural object or an imitated natural object. The nature image may include: an image captured by a camera, an image frame acquired by decoding a video, an image frame in an imitated world that is real-time rendered by a game rendering engine, or the like. A UI image may be an image created by human-computer interaction and acquired by the artificial design.

The nature image and the UI image have different image feature information. Taking an image with a Red Green Blue ("RGB") color model as an example, an image frame includes totally X*Y pixels that are laid out in an array of X rows by Y columns. Each pixel has three color channels: a red channel R, a green channel G, and a blue channel B. With respect to a pixel, each color channel of the pixel has a color level ranging from 0 to 255. For example, the pixel has a set of color levels (255, 0, 0) in the three color channels. That is, the color level in the red channel R is 255, the color level in the green channel G is 0 and the color level in the blue channel B is 0.

It should be noted that the color level can also be referred to as other names such as brightness, gray level, channel value, or the like. In the exemplary embodiment, three color channels are used as an example, but the number of color channels is not limited to three. The image frame may have four or more color channels when the image has a different color model.

Figure 2A:
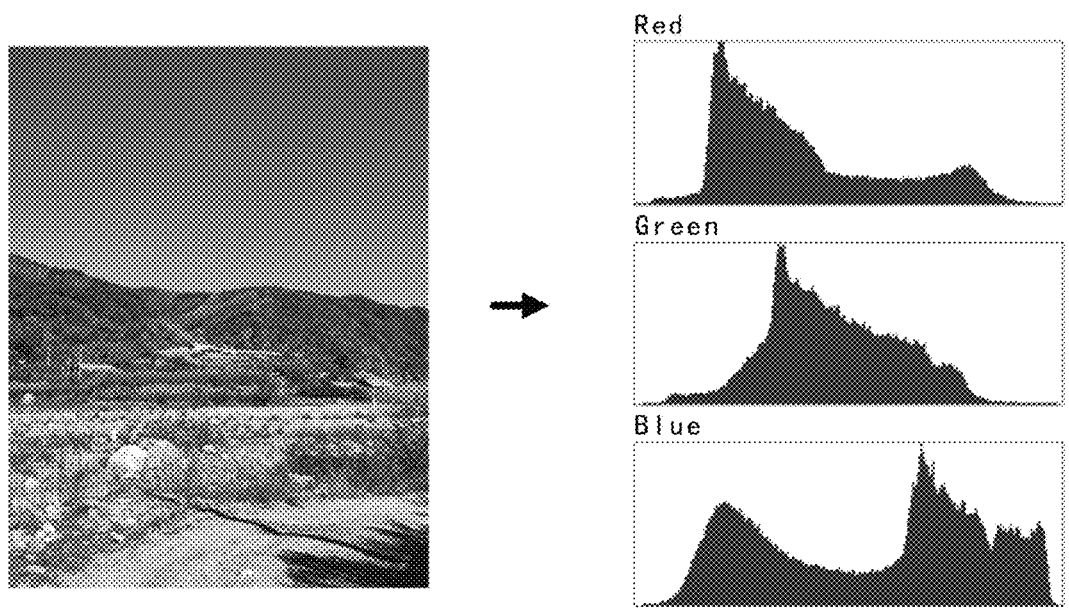
FIG. 2A is a schematic diagram illustrating a nature image and a "color level-pixel number" histogram of the nature image according to an exemplary embodiment.

FIG. 2A shows a nature image and a "color level-pixel number" histogram of the nature image in three color channels. The nature image is an image of outdoor landscapes. The histogram provides a pixel distribution corresponding relationship of the nature image in the form of a chart. The pixel distribution corresponding relationship includes a corresponding relationship between each color level and a number of pixels with the color level. In the histogram, a horizontal ordinate value indicates a color level and a vertical ordinate value indicates a number of pixels having the color level in the image. Normally, the range of the color level is [0, 255]. The examples of the corresponding relationship between the color level and the number of pixels with the color level are provided as follows.

As for the red channel R of the image, the number of pixels with the color level 0 is 1, the number of pixels with the color level 1 is 2, the number of pixels with the color level 2 is 2, the number of pixels with the color level 3 is 5, . . . , the number of pixels with the color level 67 is 130, . . . , the number of pixels with the color level 255 is 1.

As for the green channel G of the image, the number of pixels with the color level 0 is 0, the number of pixels with the color level 1 is 0, the number of pixels with the color level 2 is 1, the number of pixels with the color level 3 is 5, . . . , the number of pixels with the color level 102 is 130, . . . , the number of pixels with the color level 255 is 0.

As for the blue channel B of the image, the number of pixels with the color level 0 is 0, . . . , the number of pixels with the color level 24 is 50, the number of pixels with the color level 25 is 52, the number of pixels with the color level 26 is 56, . . . , the number of pixels with the color level 255 is 1.

As shown in the histogram, the changing pattern of the number of pixels with a color level with respect to the number of pixels with an adjacent color level is a gradually changing pattern which conforms to a Normal distribution and includes no abrupt changes. The number of pixels corresponding to each color level is random and scattered. For example, the ratio of the numbers of pixels corresponding to adjacent color levels is 0.9907635 which is not an integer.

Figure 2B:
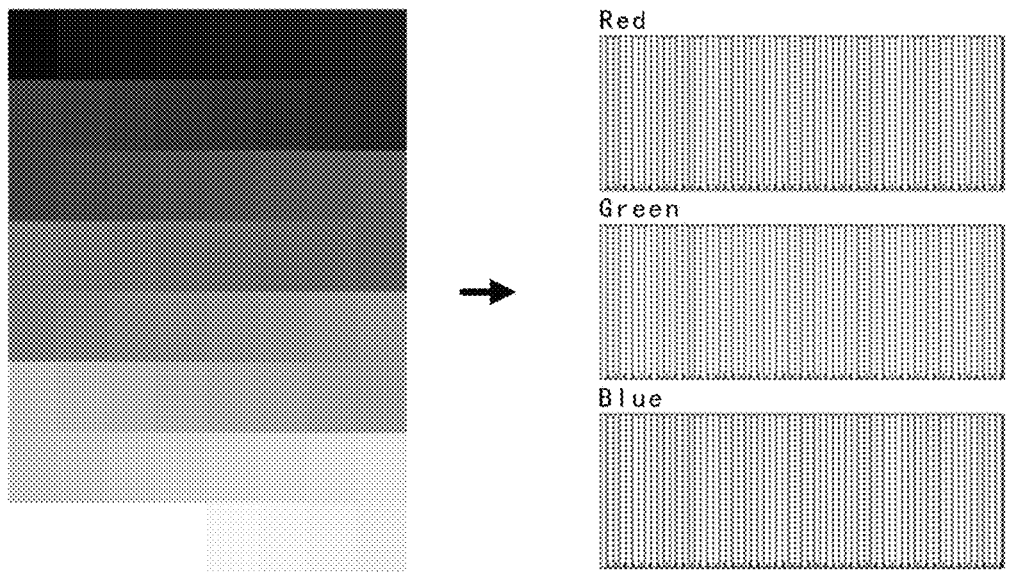
FIG. 2B is a schematic diagram illustrating a user interface (UI) image and a "color level-pixel number" histogram of the UI image according to an exemplary embodiment.

FIG. 2B shows a UI image and a "color level-pixel number" histogram of the UI image in three color channels. The UI image includes a variety of color blocks with gradually changing colors. In the histogram, the numbers of pixels corresponding to the individual color levels conform to a periodic distribution, in which a relatively large number (indicated by the vertical line in the figure) appears every X color levels.

Figure 2C:
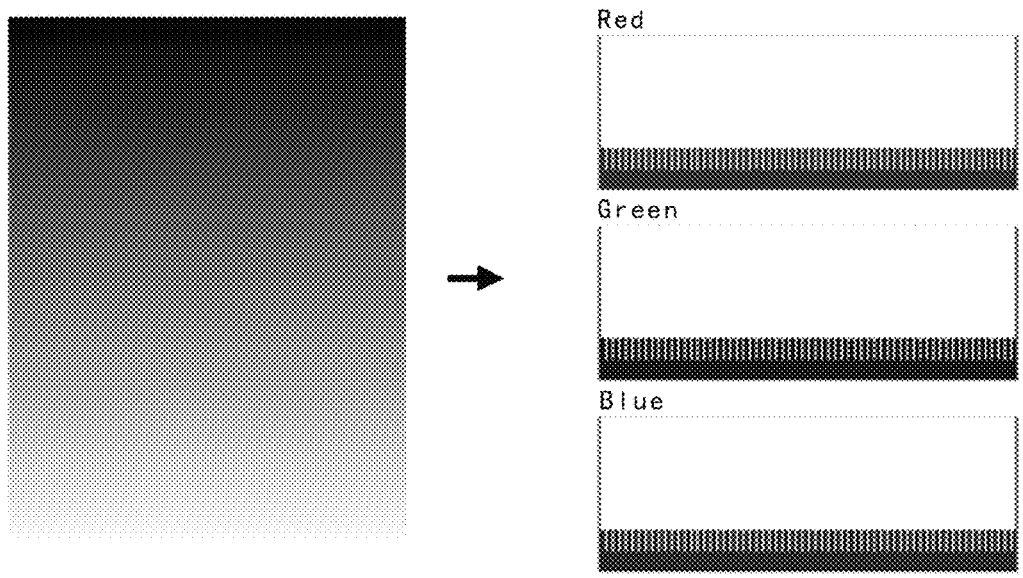
FIG. 2C is a schematic diagram illustrating a UI image and a "color level-pixel number" histogram of the UI image according to an exemplary embodiment.

FIG. 2C shows another UI image and a "color level-pixel number" histogram of the UI image in three color channels. The UI image includes a variety of color bands with gradually changing colors. In the histogram, the numbers of pixels corresponding to the individual color levels conform to a periodic distribution, in which the numbers of pixels corresponding to a set of color levels are Y, the numbers of pixels corresponding to another set of color levels are 2Y, and the two sets of color levels alternately appear on the horizontal ordinate.

Figure 2D:
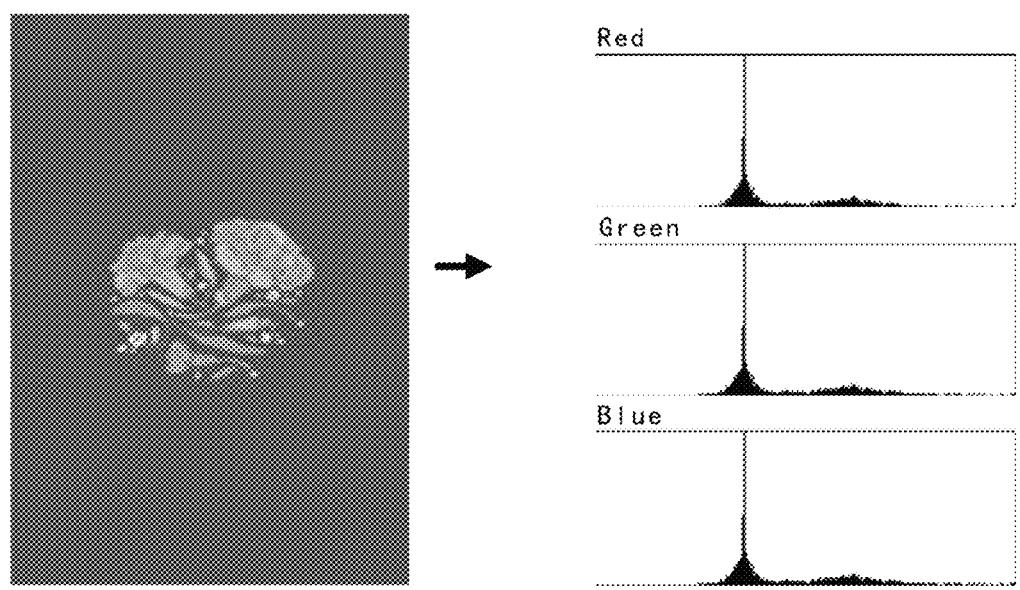
FIG. 2D is a schematic diagram illustrating a UI image and a "color level-pixel number" histogram of the UI image according to an exemplary embodiment.

FIG. 2D shows another UI image and a "color level-pixel number" histogram of the UI image in three color channels. The UI image includes a monochrome background and a floral pattern in the center of the image. Since the color level of each pixel in the monochrome background is totally same, most color levels in the histogram are 0 or not larger than 50. Only a little set of color levels located at the middle left part of the histogram have relatively large values. Moreover, there is an abrupt changing pattern between the numbers of pixels corresponding to the little set of color levels with and the numbers of pixels corresponding to color levels at both adjacent sides of the little set of color levels, and the abrupt change is from relatively large numbers to relatively small numbers. Optionally, the relatively small numbers are in the range of (0, 50).

As can be seen from FIG. 2B to FIG. 2D, since the UI image is an artificially designed image which usually has a monochrome background, a combination of several basic colors or a regular design pattern, there is an abrupt changing pattern between the numbers of pixels corresponding to adjacent color levels, or there are regular features in certain dimensions of the color levels in the UI image, the number of pixels with a certain color level or the color levels of certain pixels in each color channel.

In the following embodiments with reference to FIG. 3 to FIG. 5, the step 104 of identifying an image type of an image will be described in detail. The image type of the image is identified by an abrupt changing pattern in the embodiment of FIG. 3; the image type of the image is identified by regular features in the embodiment of FIG. 4; and the image type of the image is identified by both the abrupt changing pattern and the regular features in the embodiment of FIG. 5.

Figure 3:
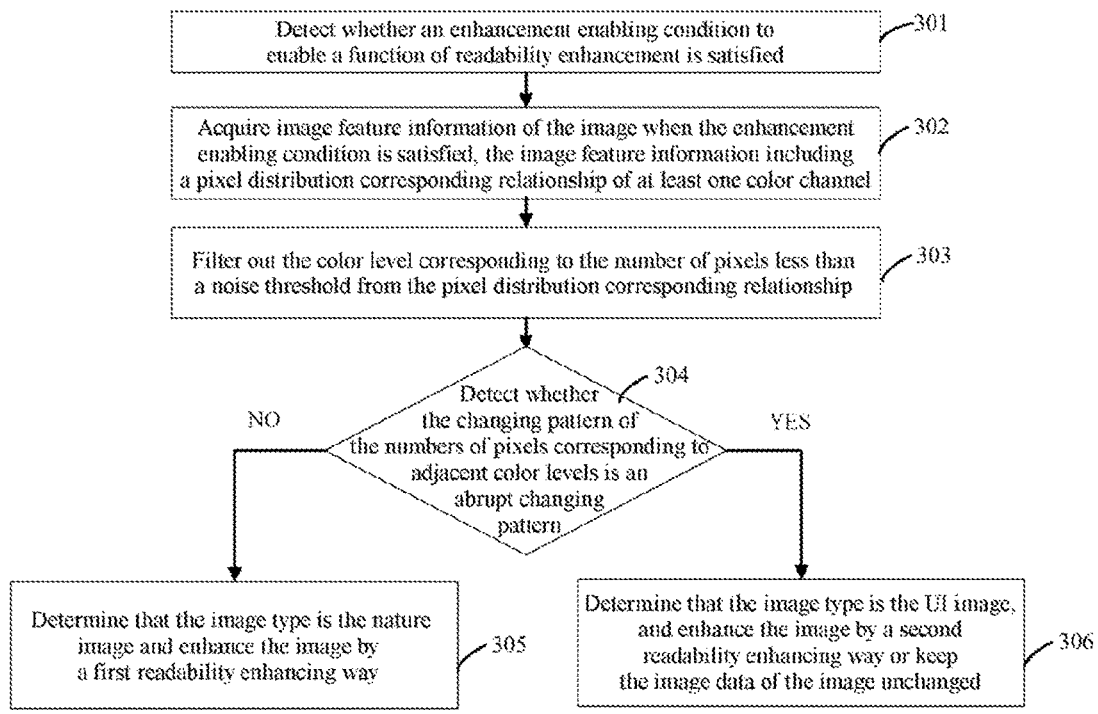
FIG. 3 is a flow chart illustrating a method for enhancing readability according to an exemplary embodiment.

FIG. 3 is a flow chart illustrating a method for enhancing readability according to an exemplary embodiment. For instance, a terminal capable of image processing can be taken as an application example to describe the method of the exemplary embodiment. The method of FIG. 3 may include the following steps.

In step 301, it can be detected whether an enhancement enabling condition to enable a function of readability enhancement is satisfied.

In general, the function of readability enhancement in the terminal is inactive or is disabled.

Optionally or alternatively, the enhancement enabling condition to enable the function of readability enhancement may include but not be limited to at least one of the following conditions:

1. A designated application program starts. For example, an eBook Reader program starts.

2. A setting option of the function of readability enhancement is set to be enabled.

3. Light intensity of environment illumination exceeds a predetermined threshold. For example, the terminal is under direct sunlight.

When the enhancement enabling condition is satisfied or met, the process continues to step 302; otherwise, no actions will be taken.

In step 302, when the enhancement enabling condition is satisfied or met, image feature information of the image can be acquired. The image feature information may include a pixel distribution corresponding relationship of at least one color channel.

In normal operational processes, the terminal may generate image frames to be displayed. Optionally or alternatively, the images to be displayed may be UI images generated by an operational system, UI images generated by an application program, nature images displayed by a video player, nature images generated by a game program, or pictures captured by a camera program.

The terminal can read out the images as the images to be processed and acquire the image feature information of the images.

Optionally or alternatively, the pixel distribution corresponding relationship includes a corresponding relationship between each color level and the number of pixels with the color level, for example, the corresponding relationship as illustrated in FIG. 2A to FIG. 2D.

After acquiring image data of an image and based on the image data, the terminal can derive the pixel distribution corresponding relationship of at least one color channel of the image as the image feature information.

Depending on computational ability, computational speed, real-time requirement and the like of the terminal, optionally or alternatively, the terminal can derive the pixel distribution corresponding relationship of one color channel; optionally or alternatively, the terminal can derive the pixel distribution corresponding relationships of two color channels; optionally or alternatively, the terminal can derive the pixel distribution corresponding relationships of all color channels.

In step 303, the color levels that are corresponding to the numbers of pixels less than a noise threshold can be filtered out from the pixel distribution corresponding relationship.

In the pixel distribution corresponding relationship, there are some color levels which have very few corresponding pixels and are considered as insignificant noise. Therefore, optionally or alternatively, the terminal can filter out the color levels that are corresponding to the number of pixels less than the noise threshold. The "filter out" means to eliminate the color levels that are corresponding to the number of pixels less than the noise threshold, or set the number of pixels corresponding to a certain color level to be 0 in case that the number of pixels corresponding to the color level is less than the noise threshold.

Optionally or alternatively, the noise threshold is a numerical threshold, for example, the numerical threshold 60; optionally or alternatively, the noise threshold is a ratio threshold, for example, 1/10000 of the total number of pixels.

In step 304, it can be detected whether the changing pattern of the numbers of pixels corresponding to adjacent color levels is an abrupt changing pattern.

Optionally or alternatively, the abrupt changing pattern may include: for each of $n_1$ sets of adjacent color levels, the difference of the numbers of pixels corresponding to the set of adjacent color levels is larger than a first threshold; or for each of $n_2$ sets of adjacent color levels, the ratio of the numbers of pixels corresponding to the set of adjacent color levels is larger than a second threshold, wherein $n_1$ and $n_2$ are positive integers.

The adjacent color levels mean: the $i^{th}$ color level and the $(i+k)^{th}$ color level, wherein i is an integer and k is a preset number. As an example, for k=1 and i=102, the first color level and the second color level are adjacent color levels, the $102^{nd}$ color level and the $103^{rd}$ color level are adjacent color levels; as another example, for k=2 and i=99, the first color level and the third color level are adjacent color levels, the $99^{th}$ color level and the $101^{st}$ color level are adjacent color levels. Optionally or alternatively, the value of k can be preset.

Optionally or alternatively, k may be a preset number that include all positive integer number and k itself. For example, when i=100 and k=5, the adjacent color levels may include five color sets that include: the $100^{th}$ color level and the $101^{st}$ color level, $100^{th}$ color level and the $102^{nd}$ color level, $100^{th}$ color level and the $103^{rd}$ color level, $100^{th}$ color level and the $104^{th}$ color level, and $100^{th}$ color level and the $105^{th}$ color level.

The terminal may detect whether the changing pattern for a number of pixels corresponding to n sets of adjacent color levels is the abrupt changing pattern. Optionally or alternatively, the n sets that terminal detects may include all possible sets of adjacent color levels or for a predetermined number of sets of adjacent color levels for the number of pixels of the image. The number of pixels to be detected may be a predetermined number of pixels or may be every one of pixels in the image.

If no abrupt changing pattern can be found, it can be determined that the image type is the nature image, and then the process continues to step 305; if the abrupt changing pattern is detected, it can be determined that the image type is the UI image, and then the process continues to step 306.

In step 305, it is determined that the image type is the nature image, and thus the image is enhanced by a first readability enhancing way.

In step 306, it is determined that the image type is the UI image, and thus the image is enhanced by a second readability enhancing way, or the image data of the image keeps unchanged.

Herein, the enhancement level of the second readability enhancing way may be lower than the enhancement level of the first readability enhancing way. As such, the level of changes for the second readability enhancing way may be less than the level of changes for the first readability enhancing way.

Optionally or alternatively, the readability enhancing way may include: Global enhancing way and Local enhancing way.

Global enhancing way: In an image frame, the image data with a same gray level can be adjusted by a same way (e.g. using a same Gamma curve) without considering the content of surrounding pixels. For example, all of the gray levels 5 are adjusted to a gray level 10. The Global enhancing way has a fast computational speed and is easy to perform.

Local enhancing way: An image frame can be divided into multiple image blocks, e.g. each image block having 64 pixels by 64 pixels; and with respect to a gray level lower than a threshold in each image block, an enhancement value can be calculated with reference to gray levels of pixels surrounding the pixel with the gray level and then used to enhance the gray level. For example, in the first image block, with respect to the gray level 5, if the calculated enhancement value with reference to gray levels of surrounding pixels is 1, then the gray level 5 is enhanced to the gray level 6; or with respect to the gray level 5, if the calculated enhancement value with reference to gray levels of surrounding pixels is 4, then the gray level 5 is enhanced to the gray level 9.

Optionally or alternatively, the gray level can be calculated by using the color levels in RGB channels; optionally or alternatively, the gray level can be denoted by the value of the vector V in the Hue, Saturation, Value (HSV) form when the image is converted into the HSV form. The embodiment will not limit the way to calculate or denote the gray level of each pixel.

It should be appreciated that the embodiment will not limit the way to enhance readability and the above described way to enhance readability is only for illustration.

As above described, the embodiment provides a method for enhancing readability, which can detect whether the changing pattern of the numbers of pixels corresponding to adjacent color levels is an abrupt changing pattern; determine that the image is a nature image and enhance the image with a first readability enhancing way if the changing pattern is not the abrupt changing pattern; and determine that the image is a UI image and enhance the image with a second readability enhancing way or do not enhance the image if the changing pattern is the abrupt changing pattern. Different from enhancing every image frame with the same readability enhancing way which may damage the beauty of a UI image, the method in the embodiment can apply different readability enhancing ways to enhance different types of image frames. Therefore, each type of images can have good readability and then the display effect of the terminal can be improved.

In addition, the method for enhancing readability of the exemplary embodiment can filter out noise data from the pixel distribution corresponding relationship, so as to reduce the disturbance to subsequent detections caused by the noise data and thus increase computational accuracy.

Figure 4:
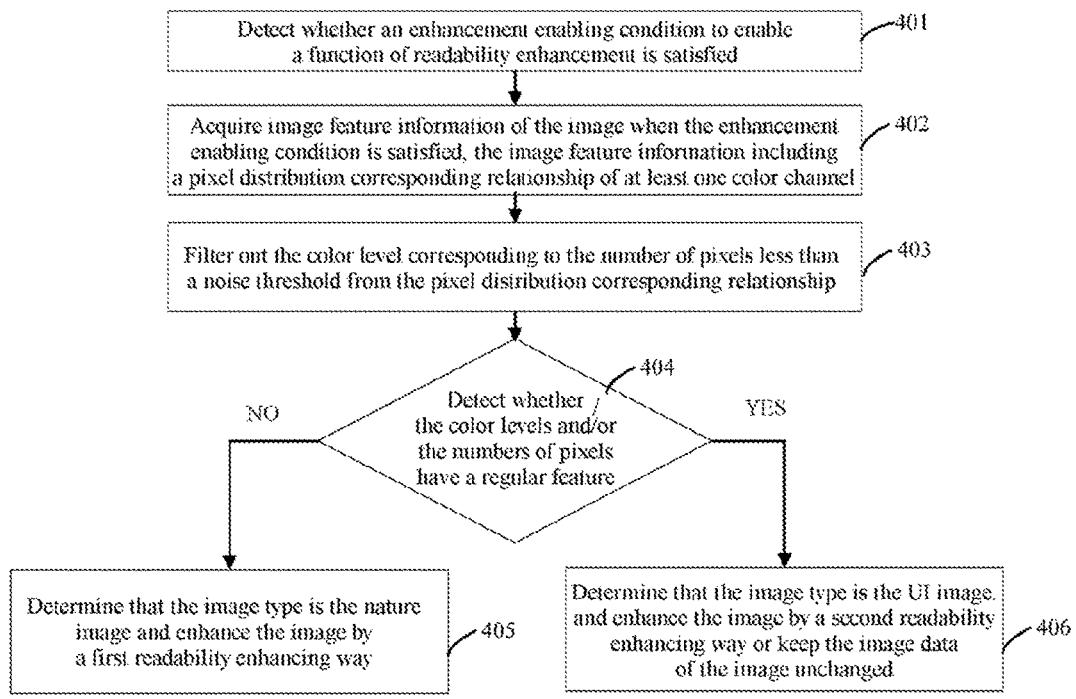
FIG. 4 is a flow chart illustrating a method for enhancing readability according to an exemplary embodiment.

FIG. 4 is a flow chart illustrating a method for enhancing readability according to an exemplary embodiment. For instance, a terminal capable of image processing can be taken as an application example to describe the method of the exemplary embodiment. The method of FIG. 4 may include the following steps.

In step 401, it can be detected whether an enhancement enabling condition to enable a function of readability enhancement is satisfied.

In general, the function of readability enhancement in the terminal is inactive or is disabled.

Optionally or alternatively, the enhancement enabling condition to enable the function of readability enhancement may include but not be limited to at least one of the following conditions:

1. A designated application program starts. For example, an eBook Reader program starts.

2. A setting option of the function of readability enhancement is set to be enabled.

3. Light intensity of environment illumination exceeds a predetermined threshold. For example, the terminal is under direct sunlight.

When the enhancement enabling condition is satisfied, the process continues to step 402; otherwise, no actions will be taken, and the process ends.

In step 402, image feature information of the image can be acquired. The image feature information may include a pixel distribution corresponding relationship of at least one color channel.

In normal operational processes, the terminal may generate image frames to be displayed. Optionally or alternatively, the images to be displayed may be UI images generated by an operational system, UI images generated by an application program, nature images displayed by a video player, nature images generated by a game program, or pictures captured by a camera program.

The terminal can read out the images as the images to be processed and acquire the image feature information of the images.

Optionally or alternatively, the pixel distribution corresponding relationship includes a corresponding relationship between each color level and the number of pixels with the color level, for example, the corresponding relationship as illustrated in FIG. 2A to FIG. 2D.

After acquiring image data of an image and based on the image data, the terminal can derive the pixel distribution corresponding relationship of at least one color channel of the image as the image feature information.

Depending on computational ability, computational speed, real-time requirement and the like of the terminal, optionally or alternatively, the terminal can derive the pixel distribution corresponding relationship of one color channel; optionally or alternatively, the terminal can derive the pixel distribution corresponding relationships of two color channels; optionally or alternatively, the terminal can derive the pixel distribution corresponding relationships of all color channels.

In step 403, the color levels that are corresponding to a number of pixels less than a noise threshold can be filtered out from the pixel distribution corresponding relationship.

In the pixel distribution corresponding relationship, there are some color levels which have very few corresponding pixels and are considered as meaningless noise. Optionally or alternatively, the terminal can filter out the color levels that are corresponding to the number of pixels less than the noise threshold. The "filter out" means to eliminate the color levels that are corresponding to the number of pixels less than the noise threshold, or set the number of pixels corresponding to a certain color level to be 0 in case that the number of pixels corresponding to the color level is less than the noise threshold.

Optionally or alternatively, the noise threshold is a numerical threshold, for example, the numerical threshold 60; optionally or alternatively, the noise threshold is a ratio threshold, for example, 1/10000 of the total number of pixels.

In step 404, it can be detected whether the color levels and/or the numbers of pixels have a regular feature.

As an artificially designed image, a UI image may have regular features in aspects of the color levels, the pixels corresponding to certain color levels, the corresponding relationship between a color level and a number of pixels corresponding to the color level, the color levels of certain pixels, and the like.

Optionally or alternatively, the regular features of the UI image may include but not be limited to at least one of the following features:

1. The ratio of the numbers of pixels corresponding to each of $n_3$ sets of adjacent color levels is an integer.

For example, in FIG. 2B, the number of pixels corresponding to the $i^{th}$ color level is X and the number of pixels corresponding to the $(i+k)^{th}$ color level is X. The ratio of the numbers of pixels corresponding to each of many sets of adjacent color levels is 1.

For example, in FIG. 2C, the number of pixels corresponding to the $i^{th}$ color level may be Y and the number of pixels corresponding to the $(i+k)^{th}$ color level may be 2Y. The ratio of the numbers of pixels corresponding to each of many sets of adjacent color levels is 2.

2. The numbers of pixels corresponding to each of $n_4$ color levels in all color channels are equal.

For example, in FIG. 2B or FIG. 2C or FIG. 2D, the numbers of pixels corresponding to each color level in red channel R, green channel G and blue channel B are equal. The pixel values for red, green and blue channels are the same.

3. The numbers of pixels corresponding to each of $n_5$ color levels in all color channels have predetermined ratios which may not be equal to 1.

For example, a UI image only includes a first type of pixels with color levels (255, 0, 0) and a second type of pixels with color levels (0, 255, 0). The number of the first type of pixels is 1/3 of the total number of pixels and the number of the second type of pixels is 2/3 of the total number of pixels. Assuming that with respect to the color level 0, the number of pixels in the red channel R is 200, the number of pixels in the green channel G is 100, and the number of pixels in the blue channel B is 200, then the ratio of the numbers of pixels corresponding to the color level 0 in the red channel and the green channel is 2, and the ratio of the numbers of pixels corresponding to the color level 0 in the green channel and the blue channel is 1/2.

4. The image includes $n_6$ pixels having the same color levels in each color channel.

For example, a monochrome image or the image as shown in FIG. 2D may include more than 100 pixels having the same color levels (a, b, c).

Herein, $n_3$, $n_4$, $n_5$ and $n_6$ may be positive integers.

The terminal may detect whether the color levels and/or the numbers of pixels have regular features. Optionally or alternatively, the terminal may make the detection to all of the color levels and/or the numbers of pixels, or the terminal may make the detection to a sample of the color levels and/or the numbers of pixels.

If the color levels and/or the numbers of pixels do not have the regular feature, it can be determined that the image type of the image is the nature image and the process continues to step 405; if the color levels and/or the numbers of pixels have the regular feature, it can be determined that the image type of the image is the UI image and the process continues to step 406.

For example, when the difference of the numbers of pixels corresponding to each of 4 sets of adjacent color levels is larger than 80, it can be determined that the image type of the image is the UI image; when the difference of the numbers of pixels corresponding to each of all sets of adjacent color levels is smaller than 80, or when the difference of the numbers of pixels corresponding to one set of adjacent color levels or two or three sets of adjacent color levels are larger than 80, it can be determined that the image type of the image is the nature image.

In step 405, it is determined that the image type is the nature image, and thus the image is enhanced by a first readability enhancing way.

In step 406, it is determined that the image type is the UI image, and thus the image is enhanced by a second readability enhancing way, or the image data of the image keeps unchanged.

Herein, the enhancement level of the second readability enhancing way is lower than the enhancement level of the first readability enhancing way. The changes to be made for the second readability enhancing way may thus be less than the first readability enhancing way.

Optionally or alternatively, the readability enhancing way may include: Global enhancing way and Local enhancing way.

Global enhancing way: In an image frame, the image data with a same gray level can be adjusted by a same way (e.g. using a same Gamma curve) without considering the content of surrounding pixels. For example, all of the gray levels 5 are adjusted to a gray level 10. The Global enhancing way has a fast computational speed and is easy to perform.

Local enhancing way: An image frame can be divided into multiple image blocks, e.g. each image block having 64 pixels by 64 pixels; and with respect to a gray level lower than a threshold in each image block, an enhancement value can be calculated with reference to gray levels of pixels surrounding the pixel with the gray level and then used to enhance the gray level. For example, in the first image block, with respect to the gray level 5, if the calculated enhancement value with reference to gray levels of surrounding pixels is 1, then the gray level 5 is enhanced to the gray level 6; or with respect to the gray level 5, if the calculated enhancement value with reference to gray levels of surrounding pixels is 4, then the gray level 5 is enhanced to the gray level 9.

Optionally or alternatively, the gray level can be calculated by using the color levels in RGB channels; optionally or alternatively, the gray level can be denoted by the value of the vector V in the Hue, Saturation, Value (HSV) form when the image is converted into the HSV form. The embodiment will not limit the way to calculate or denote the gray level of each pixel.

It should be appreciated that the embodiment will not limit the way to enhance readability and the above described way to enhance readability is only for illustration.

As above described, the embodiment provides a method for enhancing readability, which can detect whether color levels and/or numbers of pixels have a regular feature; determine that the image is a nature image and enhance the image with a first readability enhancing way if the color levels and/or the numbers of pixels do not have the regular feature; and determine that the image is a UI image and enhance the image with a second readability enhancing way or do not enhance the image if the color levels and/or the numbers of pixels have the regular feature. Different from enhancing every image frame with the same readability enhancing way that may damage the beauty of a UI image, the method in the embodiment can apply different readability enhancing ways to enhance different types of image frames. Therefore, each type of images can have good readability and then the display effect of the terminal can be improved.

In addition, the method for enhancing readability of the exemplary embodiment can filter out noise data from the pixel distribution corresponding relationship, so as to reduce the disturbance to subsequent detections caused by the noise data and thus increase computational accuracy.

Figure 5:
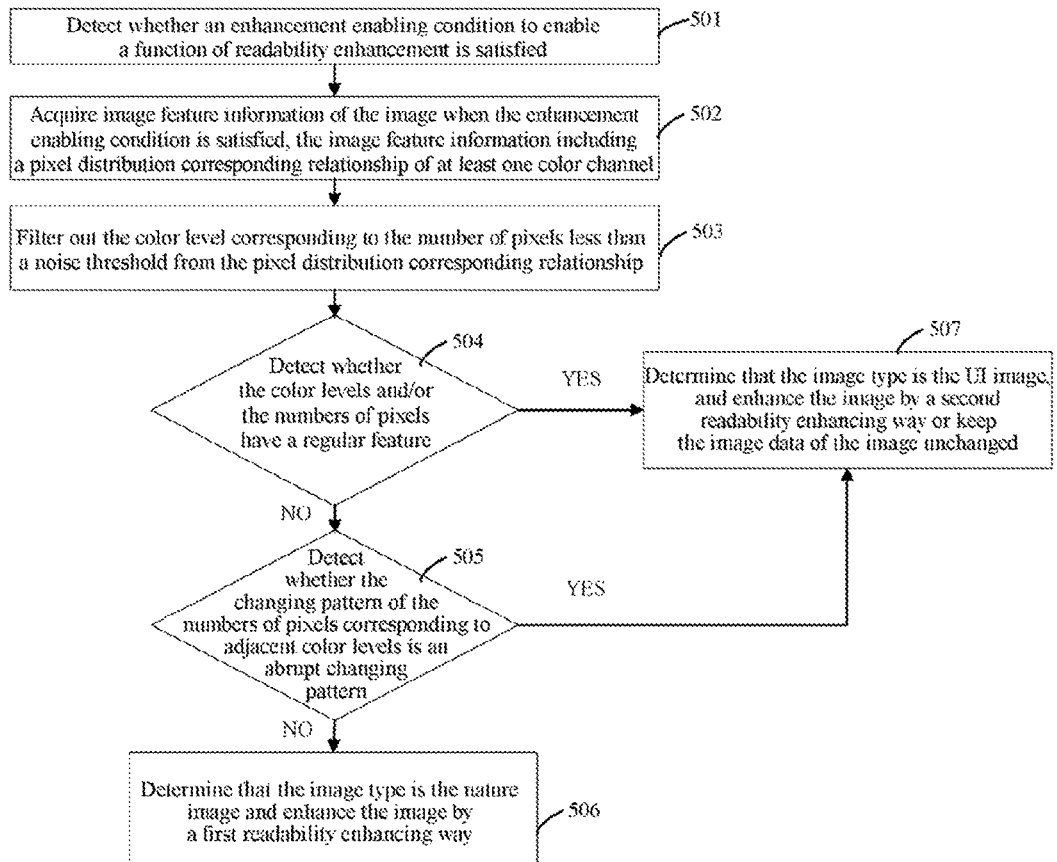
FIG. 5 is a flow chart illustrating a method for enhancing readability according to an exemplary embodiment.

The following embodiment as illustrated by FIG. 5 is an embodiment combining the embodiments of FIG. 3 and FIG. 4.

FIG. 5 is a flow chart illustrating a method for enhancing readability according to an exemplary embodiment. For instance, a terminal capable of image processing can be used as an application example to describe the method of the exemplary embodiment. The method of FIG. 5 may include the following steps.

In step 501, it can be detected whether an enhancement enabling condition to enable a function of readability enhancement is satisfied or met.

Optionally or alternatively, the enhancement enabling condition to enable the function of readability enhancement may include but not be limited to at least one of the following conditions:

1. A designated application program starts. For example, an eBook Reader program starts.

2. A setting option of the function of readability enhancement is set to be enabled.

3. Light intensity of environment illumination exceeds a predetermined threshold. For example, the terminal is under direct sunlight.

When the enhancement enabling condition is satisfied, the process continues to step 502; otherwise, no actions will be taken.

In step 502, image feature information of the image can be acquired. The image feature information may include a pixel distribution corresponding relationship of at least one color channel.

In step 503, the color levels that are corresponding to the numbers of pixels less than a noise threshold can be filtered out from the pixel distribution corresponding relationship.

In step 504, it can be detected whether the color levels and/or the numbers of pixels have regular features.

Optionally or alternatively, the regular features of a UI image may include but not be limited to at least one of the following features:

1. The ratio of the numbers of pixels corresponding to each of $n_3$ sets of adjacent color levels is an integer.

2. The numbers of pixels corresponding to each of $n_4$ color levels in all color channels are equal.

3. The numbers of pixels corresponding to each of $n_5$ color levels in all color channels have predetermined ratios which are not equal to 1.

4. The image includes $n_6$ pixels having the same color levels in each color channel.

Herein, $n_3$, $n_4$, $n_5$ and $n_6$ are positive integers.

If the color levels and/or the numbers of pixels do not have the regular feature, the process continues to step 505 to make further detections; if the color levels and/or the numbers of pixels have the regular feature, it can be determined that the image type of the image is the UI image and the process continues to step 507.

In step 505, it can be detected whether the changing pattern of the numbers of pixels corresponding to adjacent color levels is an abrupt changing pattern.

Optionally or alternatively, the abrupt changing pattern may include: the difference of the numbers of pixels corresponding to each of $n_1$ sets of adjacent color levels is larger than a first threshold; or the ratio of the numbers of pixels corresponding to each of $n_2$ sets of adjacent color levels is larger than a second threshold, wherein $n_1$ and $n_2$ are positive integers.

If the changing pattern is not the abrupt changing pattern, it can be determined that the image type of the image is the nature image, and then the process continues to step 506; if the changing pattern is the abrupt changing pattern, it can be determined that the image type of the image is the UI image, and then the process continues to step 507.

In step 506, it is determined that the image type is the nature image, and thus the image is enhanced by a first readability enhancing way.

In step 507, it is determined that the image type is the UI image, and thus the image is enhanced by a second readability enhancing way, or the image data of the image keeps unchanged.

Herein, the enhancement level of the second readability enhancing way may be lower than the enhancement level of the first readability enhancing way.

Reference can be made to the description about the embodiments of FIG. 3 and/or FIG. 4 for the steps in the embodiment of FIG. 5 that are same or similar as those in the embodiments of FIG. 3 and/or FIG. 4.

As above described, the embodiment of FIG. 5 provides a method for enhancing readability, which can precisely identify the image type of the image by detecting both "regular features" and "abrupt changing pattern", then apply a first readability enhancement to the nature images and apply a second readability enhancement or no readability enhancement to the UI images. Different from enhancing every image frame with the same readability enhancing way that may damage the beauty of a UI image, the method in the embodiment can apply different readability enhancing ways to enhance different types of image frames. Therefore, each type of images can have good readability and then the display effect of the terminal can be improved.

In addition, the method for enhancing readability of the exemplary embodiment can filter out noise data from the pixel distribution corresponding relationship, so as to reduce the disturbance to subsequent detections caused by the noise data and thus increase computational accuracy.

The following embodiments are exemplary embodiments regarding devices that can perform the exemplary methods in the present disclosure. Reference can be made to the embodiments regarding the methods for enhancing readability in the present disclosure for the details that are not disclosed in the following embodiments.

Figure 6:
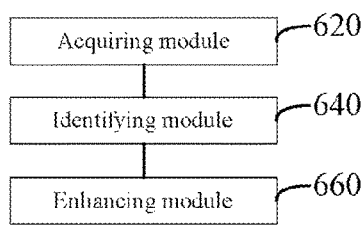
FIG. 6 is a block diagram illustrating a device for enhancing readability according to an exemplary embodiment.

FIG. 6 is a block diagram illustrating a device for enhancing readability according to an exemplary embodiment. The device for enhancing readability can be made as a part of a terminal or as the whole terminal by application specific hardware circuits and/or combination of software and hardware. Referring to FIG. 6, the device may include an acquiring module 620, an identifying module 640 and an enhancing module 660.

The acquiring module 620 can be configured to acquire image feature information of an image.

The identifying module 640 can be configured to identify an image type of the image based on the image feature information.

The enhancing module 660 can be configured to select a readability enhancing way corresponding to the image type and enhance the image by the readability enhancing way.

Optionally or alternatively, the image feature information may include a pixel distribution corresponding relationship of at least one color channel. The pixel distribution corresponding relationship may include a corresponding relationship between a color level and a number of pixels with the color level.

The identifying module 640 can be configured to detect whether a changing pattern of the numbers of pixels corresponding to adjacent color levels is an abrupt changing pattern; determine that the image type of the image is a nature image in the case that the changing pattern is not the abrupt changing pattern; and determine that the image type of the image is a user interface image in the case that the changing pattern is the abrupt changing pattern.

Herein, the adjacent color levels are two color levels that have a difference less than a predetermined value.

Optionally or alternatively, the abrupt changing pattern may include: a difference of the numbers of pixels corresponding to each of $n_1$ sets of adjacent color levels is larger than a first threshold; or a ratio of the numbers of pixels corresponding to each of $n_2$ sets of adjacent color levels is larger than a second threshold, wherein $n_1$ and $n_2$ may be positive integers.

Optionally or alternatively, the image feature information includes a pixel distribution corresponding relationship of at least one color channel. The pixel distribution corresponding relationship may include a corresponding relationship between a color level and a number of pixels with the color level.

The identifying module 640 can be configured to detect whether the color level and/or the number of pixels have a regular feature; determine that the image type of the image is a user interface image in the case that the color level and/or the number of pixels have the regular feature; and determine that the image type of the image is a nature image in the case that the color level and/or the number of pixels do not have the regular feature.

Optionally or alternatively, the regular feature may include: a ratio of the numbers of pixels corresponding to each of $n_3$ sets of adjacent color levels is an integer; the numbers of pixels corresponding to each of $n_4$ color levels in all color channels are equal; the numbers of pixels corresponding to each of $n_5$ color levels in all color channels have predetermined ratios; or the image includes $n_6$ pixels having the same color levels in each color channel, wherein $n_3$, $n_4$, $n_5$ and $n_6$ are positive integers Optionally or alternatively, the device may additionally include a filter module that is configured to filter out the color levels corresponding to the numbers of pixels less than a noise threshold from the pixel distribution corresponding relationship.

Optionally or alternatively, the enhancing module 600 can be configured to enhance the image by a first readability enhancing way in the case that the image type is a nature image; and enhance the image by a second readability enhancing way or keep image data of the image unchanged in the case that the image type is a user interface image.

Herein, the second readability enhancing way may have an enhancement level lower than that of the first readability enhancing way.

Optionally or alternatively, the device may additionally include an enhancement enabling module that is configured to detect whether an enhancement enabling condition for enabling readability enhancement is satisfied or met.

The acquiring module 620 may be configured to acquire the image feature information of the image when the enhancement enabling condition is satisfied or met.

As above described, the embodiment of FIG. 6 provides a device for enhancing readability, which can precisely identify the image type of the image by detecting at least one of "regular features" and "abrupt changing pattern", then apply a first readability enhancement to the nature images and apply a second readability enhancement or no readability enhancement to the UI images. Different from enhancing every image frame with the same readability enhancing way that may damage the beauty of a UI image, the device in the embodiment can apply different readability enhancing ways to enhance different types of image frames. Therefore, each type of images can have good readability and then the display effect of the terminal can be entirely improved.

In addition, the device for enhancing readability of the exemplary embodiment can filter out noise data from the pixel distribution corresponding relationship, so as to reduce the disturbance to subsequent detections caused by the noise data and thus increase computational accuracy.

With respect to the device in the above embodiment, the specific manners for performing operations in individual modules therein have been described in detail in the embodiments regarding the methods for enhancing readability, which will not be elaborated herein.

Figure 7:
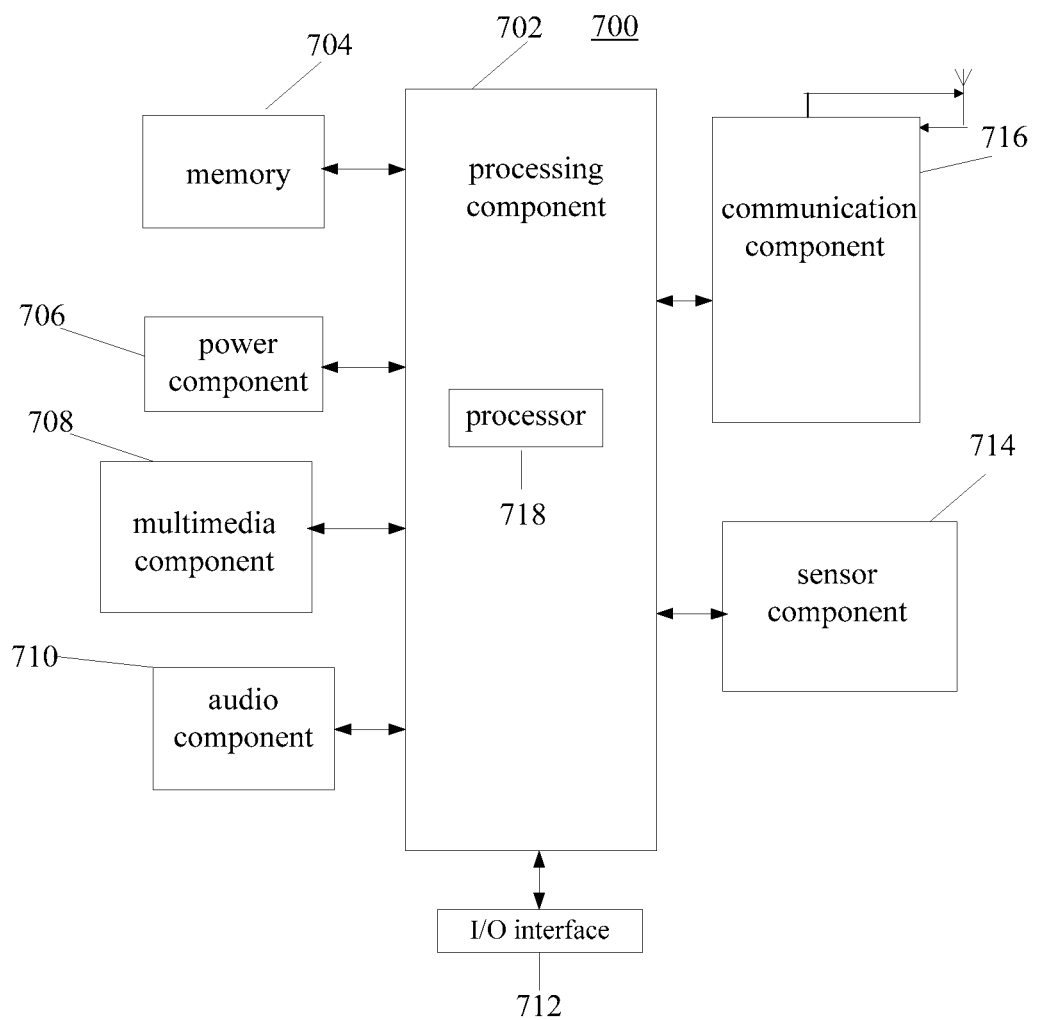
FIG. 7 is a block diagram illustrating an appliance for enhancing readability according to an exemplary embodiment.

In addition, an exemplary embodiment of an appliance for enhancing readability that is capable of performing the methods for enhancing readability in the present disclosure is provided. The appliance may include a processor and a memory for storing instructions executable by the processor. The processor can be configured to acquire image feature information of an image; identify an image type of the image based on the image feature information; select a readability enhancing way corresponding to the image type and enhance the image by the readability enhancing way FIG. 7 is a block diagram illustrating an appliance for enhancing readability according to an exemplary embodiment. For example, the appliance 700 may be a mobile phone, a computer, a digital broadcast terminal, a message transceiver, a game console, a tablet device, a medical device, a fitness equipment, a personal digital assistant, or the like.

As shown in FIG. 7, the electrical appliance 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the electrical appliance 700, such as the operations associated with display, telephone calls, data communications, camera operations, and recording operations. The processing component 702 may include one or more processors 718 to execute instructions to perform all or part of the steps in the above described methods. Moreover, the processing component 702 may include modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the electrical appliance 700. Examples of such data may include instructions for any applications or methods operated on the electrical appliance 700, contact data, phonebook data, messages, pictures, video, etc. The memory 704 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 706 provides power to various components of the electrical appliance 700. The power component 706 may include a power management system, one or more power sources, and any other components associated with the generation, management, and distribution of power in the electrical appliance 700.

The multimedia component 708 includes a screen providing an output interface between the electrical appliance 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also detect a period of time and a pressure associated with the touch or swipe action. In some embodiments, the multimedia component 708 includes a front camera and/or a rear camera. The front camera and/or the rear camera may receive an external multimedia datum while the electrical appliance 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the electrical appliance 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the electrical appliance 700. For instance, the sensor component 714 may detect an open/closed status of the electrical appliance 700, relative positioning of components, e.g., the display and the keypad, of the electrical appliance 700, a change in position of the electrical appliance 700 or a component of the electrical appliance 700, a presence or absence of user contact with the electrical appliance 700, an orientation or an acceleration/deceleration of the electrical appliance 700, and a change in temperature of the electrical appliance 700. The sensor component 714 may include a proximity sensor configured to detect the presence of nearby objects without any physical contact. The sensor component 714 may also include a light sensor, such as a Complementary Metal Oxide Semiconductor (CMOS) or Charge-coupled Device (CCD) image sensor, for use in imaging applications. In some embodiments, the sensor component 714 may also include an accelerometer sensor, a gyroscope sensor, a magnetic sensor, a distance sensor, a pressure sensor, or a temperature sensor.

The communication component 716 is configured to facilitate communication, wired or wirelessly, between the electrical appliance 700 and other devices. The electrical appliance 700 can access a wireless network based on a communication standard, such as WiFi, 2G, or 3G, or a combination thereof. In an exemplary embodiment, the communication component 716 receives a broadcast signal or broadcast associated information from an external broadcast management system via a broadcast channel. In an exemplary embodiment, the communication component 716 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the electrical appliance 700 may be implemented with Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

In exemplary embodiments, there is also provided a non-transitory computer-readable storage medium including instructions, such as the memory 704 including instructions executable by the processor 718 in the electrical appliance 700 to perform the above-described methods. For example, the non-transitory computer-readable storage medium may be a Ramdom Only Memory (ROM), a Ramdom Access Memory (RAM), a Compact Disc Read-Only Memory (CD-ROM), a magnetic tape, a floppy disc, an optical data storage device, and the like.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

Other embodiments of the invention are apparent to those skilled in the art from consideration of the specification and practice of the invention disclosed here. This application is intended to cover any variations, uses, or adaptations of the disclosure following general principles thereof and including such departures from the present disclosure as come within known or customary practice in the art. The specification and embodiments are merely considered to be exemplary and the substantive scope and spirit of the disclosure is limited only by the appended claims.

It should be understood that the disclosure is not limited to the precise structure as described above and shown in the figures, but can have various modification and alternations without departing from the scope of the disclosure. The scope of the disclosure is limited only by the appended claims.

What is claimed is:

1. A method for enhancing readability of an image displayed on a terminal, comprising:
    acquiring image feature information of the image;
    identifying an image type of the image based on the image feature information;
    selecting a readability enhancing way corresponding to the image type; and
    enhancing the image by the readability enhancing way,
    wherein the image feature information comprises a pixel distribution corresponding relationship of at least one color channel, the pixel distribution corresponding relationship comprising a corresponding relationship between a color level and a number of pixels with the color level;
    wherein identifying the image type of the image based on the image feature information comprises:
    detecting whether a changing pattern of the numbers of pixels corresponding to adjacent color levels is an abrupt changing pattern;
    determining that the image type of the image is a nature image in the case that the changing pattern is not the abrupt changing pattern; and
    determining that the image type of the image is a user interface image in the case that the changing pattern is the abrupt changing pattern; and
    wherein the adjacent color levels are two color levels that have a difference less than a predetermined value.

2. The method of claim 1, wherein the abrupt changing pattern comprises at least one of the following:
    a difference of the numbers of pixels corresponding to each of $n_1$ sets of the adjacent color levels is larger than a first threshold; and
    a ratio of the numbers of pixels corresponding to each of $n_2$ sets of the adjacent color levels is larger than a second threshold; and
    wherein the $n_1$ and $n_2$ are positive integers.

3. The method of claim 1, wherein:
    identifying the image type of the image based on the image feature information comprises:
    detecting whether the color level and/or the number of pixels have a regular feature;
    determining that the image type of the image is a user interface image in the case that the color level and/or the number of pixels have the regular feature; and
    determining that the image type of the image is a nature image in the case that the color level and/or the number of pixels do not have the regular feature.

4. The method of claim 3, wherein the regular feature comprises at least one of the following:
    a ratio of the numbers of pixels corresponding to each of $n_3$ sets of the adjacent color levels is an integer;
    the numbers of pixels corresponding to each of $n_4$ color levels in all color channels are equal;
    the numbers of pixels corresponding to each of $n_5$ color levels in all color channels have predetermined ratios which are not equal to 1; and
    the image comprises $n_6$ pixels which have same color levels in each color channel; and
    wherein the $n_3$, $n_4$, $n_5$ and $n_6$ are positive integers.

5. The method of claim 3, further comprising:
    filtering out the color level corresponding to the number of pixels less than a noise threshold from the pixel distribution corresponding relationship.

6. The method of claim 1, further comprising:
    filtering out the color level corresponding to the number of pixels less than a noise threshold from the pixel distribution corresponding relationship.

7. The method of claim 1, wherein selecting the readability enhancing way corresponding to the image type and enhancing the image by the readability enhancing way comprises:
    enhancing the image by a first readability enhancing way in the case that the image type is a nature image;
    enhancing the image by a second readability enhancing way or keeping image data of the image unchanged in the case that the image type is a user interface image; and
    wherein the second readability enhancing way has an enhancement level lower than that of the first readability enhancing way.

8. The method of claim 1, further comprising:
    detecting whether an enhancement enabling condition for enabling readability enhancement is satisfied; and acquiring the image feature information of the image in the case that the enhancement enabling condition is satisfied.

9. A device for enhancing readability of an image displayed on a terminal, comprising a communication component, a processor and a memory for storing executable instructions, wherein the processor is configured to perform the executable instructions to acquire image feature information of the image; identify an image type of the image based on the image feature information; select a readability enhancing way corresponding to the image type; and enhance the image by the readability enhancing way, wherein:

the image feature information comprises a pixel distribution corresponding relationship of at least one color channel, the pixel distribution corresponding relationship comprising a corresponding relationship between a color level and a number of pixels with the color level; and the processor is further configured to: detect whether a changing pattern of the numbers of pixels corresponding to adjacent color levels is an abrupt changing pattern; determine that the image type of the image is a nature image in the case that the changing pattern is not the abrupt changing pattern; and determine that the image type of the image is a user interface image in the case that the changing pattern is the abrupt changing pattern; and wherein the adjacent color levels are two color levels that have a difference less than a predetermined value.

10. The device of claim 9, wherein the abrupt changing pattern comprises at least one of the following:

a difference of the numbers of pixels corresponding to each of $n_1$ sets of the adjacent color levels is larger than a first threshold; and a ratio of the numbers of pixels corresponding to each of $n_2$ sets of the adjacent color levels is larger than a second threshold; and wherein the $n_1$ and $n_2$ are positive integers.

11. The device of claim 9, wherein:

the processor is further configured: to detect whether the color level and/or the number of pixels have a regular feature; determine that the image type of the image is a user interface image in the case that the color level and/or the number of pixels have the regular feature; and determine that the image type of the image is a nature image in the case that the color level and/or the number of pixels do not have the regular feature.

12. The device of claim 11, wherein the regular feature comprises at least one of the following:

a ratio of the numbers of pixels corresponding to each of $n_3$ sets of the adjacent color levels is an integer;

the numbers of pixels corresponding to each of $n_4$ color levels in all color channels are equal;

the numbers of pixels corresponding to each of $n_5$ color levels in all color channels have predetermined ratios which are not equal to 1; and the image comprises $n_6$ pixels which have same color levels in each color channel; and wherein the $n_3$, $n_4$, $n_5$ and $n_6$ are positive integers.

13. The device of claim 11, wherein the processor is further configured to filter out the color level corresponding to the number of pixels less than a noise threshold from the pixel distribution corresponding relationship.

14. The device of claim 9, wherein the processor is further configured to filter out the color level corresponding to the number of pixels less than a noise threshold from the pixel distribution corresponding relationship.

15. The device of claim 9, wherein the processor is configured to enhance the image by a first readability enhancing way in the case that the image type is a nature image; enhance the image by a second readability enhancing way or keep image data of the image unchanged in the case that the image type is a user interface image; and wherein the second readability enhancing way has an enhancement level lower than that of the first readability enhancing way.

16. The device of claim 9, wherein the processor is further configured to detect whether an enhancement enabling condition for enabling readability enhancement is satisfied and acquire the image feature information of the image in the case that the enhancement enabling condition is satisfied.

17. A non-transitory computer-readable storage medium having stored therein instructions that, when executed by a processor of a terminal, cause the terminal to:

acquire image feature information of an image displayed on the terminal;

identify an image type of the image based on the image feature information;

select a readability enhancing way corresponding to the image type and enhance the image by the readability enhancing way, wherein the image feature information comprises a pixel distribution corresponding relationship of at least one color channel, the pixel distribution corresponding relationship comprising a corresponding relationship between a color level and a number of pixels with the color level;

wherein identifying the image type of the image based on the image feature information comprises:

detecting whether a changing pattern of the numbers of pixels corresponding to adjacent color levels is an abrupt changing pattern;

determining that the image type of the image is a nature image in the case that the changing pattern is not the abrupt changing pattern; and determining that the image type of the image is a user interface image in the case that the changing pattern is the abrupt changing pattern; and wherein the adjacent color levels are two color levels that have a difference less than a predetermined value.

* * * * *